(12) United States Patent
Monno

(10) Patent No.: US 7,726,676 B2
(45) Date of Patent: Jun. 1, 2010

(54) DEVICE FOR HAND-DRIVEN OPERATION OF A GUIDED WHEEL

(76) Inventor: Bernd Monno, Förstersteig 3a, 16547 Birkenwerder (DE)

( * ) Notice: Subject to any disclaimer, the term of this patent is extended or adjusted under 35 U.S.C. 154(b) by 688 days.

(21) Appl. No.: 11/578,219

(22) PCT Filed: Oct. 8, 2004

(86) PCT No.: PCT/DE2004/002268

§ 371 (c)(1),
(2), (4) Date: Oct. 11, 2006

(87) PCT Pub. No.: WO2005/100142

PCT Pub. Date: Oct. 27, 2005

(65) Prior Publication Data

US 2007/0227277 A1    Oct. 4, 2007

(30) Foreign Application Priority Data

Apr. 13, 2004  (DE) ................. 10 2004 018 662
Jun. 25, 2004  (DE) ................. 10 2004 031 976

(51) Int. Cl.
*B62M 1/00*   (2006.01)
*B62M 1/14*   (2006.01)

(52) U.S. Cl. .................... 280/234; 280/242.1
(58) Field of Classification Search ............. 280/234, 280/242.1
See application file for complete search history.

(56) References Cited

U.S. PATENT DOCUMENTS 616,021 A * 12/1898 Schaibly ............... 280/234
4,548,420 A * 10/1985 Patroni, Jr. ............ 280/224
4,584,889 A *  4/1986 Patroni, Jr. ............... 74/49
5,039,122 A *  8/1991 Deutch et al. ........... 280/234
5,257,553 A * 11/1993 Cheng .................. 74/551.8
5,308,097 A *  5/1994 Bono et al. ............. 280/234
5,542,689 A    8/1996 Chalfant
2004/0150185 A1* 8/2004 Gonsalves ............. 280/234
2007/0164534 A1* 7/2007 Simon ................. 280/242.1

FOREIGN PATENT DOCUMENTS

DE        99 419       12/1897
DE     36 29 851        3/1988

(Continued)

*Primary Examiner*—Lesley Morris
*Assistant Examiner*—Daniel Yeagley
(74) *Attorney, Agent, or Firm*—Collard & Roe, P.C.

(57) ABSTRACT

A device for hand-driven operation of a guided wheel arranged on a steering gear is pivotable about a steering axis perpendicular to the wheel's axis of rotation. The device includes first and second handles, first and second coupling devices respectively arranged thereon, and a power transmission train coupled to transmit traction power to the second coupling device via coupling points for transmitting handle movement to a drive device cooperating with the guided wheel's hub. The power transmission train extends from the first coupling device via deflecting elements, thereby modifying the extension direction of the train, in a second power transmission section to the second coupling device such that the coupling devices move the coupling points of the train on substantially linear drive paths approaching and absenting of a symmetrical plane of guidance which is oriented in a perpendicular manner in relation to the axis of rotation of the guided wheel.

10 Claims, 10 Drawing Sheets

FOREIGN PATENT DOCUMENTS

| | | |
|---|---|---|
| DE | 101 06 283 | 9/2002 |
| FR | 736 544 | 5/1932 |
| FR | 888 234 | 2/1942 |
| FR | 1 028 272 | 11/1950 |
| FR | 2 762 283 | 10/1998 |
| GB | 538877 | 2/1940 |

* cited by examiner

DEVICE FOR HAND-DRIVEN OPERATION OF A GUIDED WHEEL

CROSS REFERENCE TO RELATED APPLICATIONS

Applicant claims priority under 35 U.S.C. §119 of German Application No. 10 2004 018 662.6 filed Apr. 13, 2004 and German Application No. 10 2004 031 976.6 filed Jun. 25, 2004. Applicant also claims priority under 35 U.S.C. §365 of PCT/DE2004/002268 filed Oct. 8, 2004. The international application under PCT article 21(2) was not published in English.

BACKGROUND OF THE INVENTION

1. Field of the Invention

The invention relates to a device for hand-driven operation of a guided wheel.

2. Description of the Related Art

A multiplicity of hand-driven devices are known from the prior art, which, particularly in the case of bicycles, ensure, in addition to the known foot-pedal drive, an additional hand-operated auxiliary drive of one of the wheels.

DE 101 06 283 A1 discloses a device for hand-driven operation of a guided wheel which is arranged on a steering gear and which is pivotable about a steering axis oriented perpendicularly with respect to the axis of rotation of the guided wheel.

This device comprises a first handle with a first coupling means arranged on the first handle and a second handle with a second coupling means arranged on the second handle. The first and the second coupling means are coupled via coupling points, so as to transmit tractive force, to a force transmission train for transmitting a movement of the handles to a drive means cooperating with the hub of the guided wheel. The drive means converts the movement of the handles into a rotational movement of the guided wheel with the aid of the force transmission train.

Furthermore, a guide means is provided, which is pivotable about the steering axis and cooperates mechanically with the steering gear. The guide means ensures, furthermore, that the handles are mounted movably. For this purpose, the guide means has a mechanical positive guide such that the handles can be moved symmetrically with respect to a steering plane of symmetry in which the steering axis lies and which is oriented perpendicularly to the axis of rotation of the guided wheel.

The coupling means of the device known from DE 101 06 283 A1 are designed as two chain wheels spaced axially apart from one another. These have drive levers arranged radially on the gearwheels and having the handles. On each of the two sides of the hub of the guided wheel, a toothed drive pinion having a freewheel is arranged, the force transmission train in the form of a link chain being guided between the toothed drive pinions and the chain wheels of the coupling means. In order to provide a handy step-up of the drive device, it is necessary to design the diameter of the chain wheels of the coupling means so as to be markedly larger than the diameter of the toothed drive pinions. To actuate the drive, it is necessary to set the chain wheels of the coupling means in an alternating rotational movement by means of the radial drive levers. On account of the abovementioned size ratios of the diameters, the result of this is that the moved parts of the hand-operated drive have comparatively high moments of inertia and the device as a whole possesses an appreciable weight.

SUMMARY OF THE INVENTION

The object on which the present invention is based is, therefore, to provide a device for hand-driven operation of a guided wheel, the moved parts of which have a lower mass or a lower mass moment of inertia, so that the device as a whole is more weight-saving and can be operated more easily.

This object is achieved by means of a device having the features in accordance with the invention.

According to the invention, there is provision for the force transmission train to extend from the first coupling means via deflection elements, which cause a change in the direction of extent of the force transmission train, in a first force transmission portion, to the drive means and from the drive means, via deflection elements which cause a change in the direction of extent of the force transmission train, in a second force transmission portion, to the second coupling means, in such a way that the coupling means moves the coupling points of the force transmission train on essentially rectilinear drive paths.

Due to the use of deflection elements which cause a change, in the direction of extent of the force transmission train, the coupling means and therefore the handles can be guided in such a way that the coupling points of the force transmission train move on essentially rectilinear drive paths. It is thereby possible to design the moved parts of the device so as to be smaller and lighter.

The feature "essentially rectilinear" is understood here to mean that not only drive paths of the coupling points which are rectilinear in the strictly geometric sense are covered, but also slightly curved drive paths. That is to say, a ratio of the length deviation of the coupling point from a strictly rectilinear drive path to the overall length of the drive path which does not overshoot a value of 1:10 is still considered as slightly curved and therefore as being essentially rectilinear within the meaning of the present invention.

Coupling points within the meaning of the present invention are all regions of the coupling means which are connected to the force transmission train so as to transmit tractive force.

The force transmission train may be designed both in one piece and as a combination of a plurality of subportions. It is essential in this case only that the subportions are connected to one another in such a way that force transmission becomes possible. For the force transmission train, for example, ropes, chains or belts, in particular toothed belts, which can absorb the tractive forces which arise, are suitable. In this case, it is advantageous if the force transmission train, at least in the region of the first and the second force transmission portion, has no appreciable elastic length variation and/or has a low dead weight.

Preferably, the drive device is designed in such a way that a length change, induced by the movement of the handles, of the first force transmission portion causes a length change of opposite sign and of identical amount of the second force transmission portion. The symmetry of the handle movement is thus accompanied by a symmetrical length change of the two force transmission portions.

The handles can in this case be moved on a multiplicity of rotational and/or translational handle guide paths. What is essential in each case is only the symmetry of the handle guide paths with respect to the steering plane of symmetry.

The guide paths have in each case two guide path end portions. The handles can be moved back and forth between the guide path end portions in alternating movements symmetrically with respect to the steering plane of symmetry.

Preferably, spring elements are provided in such a way that, during the movement of the handle in the region of the guide path end portions, a spring force oriented opposite to the direction of movement of the handles is built up. The spring elements thereby also function as energy accumulators which release the introduced energy again upon the reversal of movement.

In a first variant of the device according to the invention, the positive guidance of the handles is implemented in such a way that the force transmission train, starting from the first coupling means, forms a coupling portion which is connected via a coupling deflection element to the second coupling means so as to transmit tractive force, and the two force transmission portions (30, 31) are coupled to one another via the drive means 4 so as to transmit tractive force.

Thus, the drawing of the two handles apart from one another gives rise, with the aid of the coupling portion of the force transmission train, to a corresponding symmetrical movement of the second handle. When the handles are pressed together, the tractive force-transmitting connection of the first and of the second force transmission train ensures a symmetrical positive control of the handle movement.

So that the symmetry of the handle movements with respect to the steering plane of symmetry is ensured, it is necessary that the coupling deflection element deflects the coupling portion of the force transmission train with respect to its spatial direction of extent.

It is particularly simple if the coupling deflection element deflects the force transmission train through essentially 180 degrees. This ensures that the movement of the handles is oriented symmetrically with respect to the steering plane of symmetry and no further deflection element for the coupling portion of the force transmission train is required between the coupling deflection element and the second coupling means.

A simple symmetrical construction of the device is obtained in that the second force transmission portion of the force transmission train has a force transmission deflection element for deflecting the direction of extent of the second force transmission portion, this force transmission deflection element being oriented mirror-symmetrically with respect to the steering axis in relation to the coupling deflection element of the coupling portion.

The steering gear for receiving the guided wheel preferably has a fork which is designed and arranged symmetrically with respect to the steering plane of symmetry. Furthermore, the steering gear comprises a steering shaft arranged on the fork and extended along the steering axis. Preferably, a crossmember extending transversely with respect to the steering axis is fastened to the steering shaft. The coupling deflection element and the force transmission deflection element are fixed to the end portions of said crossmember. In order to ensure the symmetry of the handle movements, the crossmember is preferably designed symmetrically with respect to the steering plane of symmetry at least in terms of the positioning of its end portions.

It is, of course, also conceivable that the steering gear has, instead of a fork, a bearing arm on which the guided wheel is mounted. In this case, it is not mandatory that the bearing arm be oriented so as to lie in the steering plane of symmetry.

A first and a second force deflection element are fixed to the steering shaft and/or to the crossmember, in order to deflect the first and the second force transmission portion of the force transmission train in the direction of the drive device. The drive means is in this case arranged conventionally in the region of the hub or of the fork of the steering gear.

In a preferred embodiment of the drive device, the crossmember has two sliding portions designed symmetrically with respect to the steering plane of symmetry. The handles are in this case designed in such a way that, together with the assigned coupling means, they are movable back and forth along these sliding portions.

In order to prevent a pivoting of the handles about the sliding axis, on the one hand, both the handle and the crossmember can be designed in the region of the sliding portions, with respect to their cross-sectional geometry, in such a way that a pivoting of the handle about the sliding axis is blocked. On the other hand, alternatively or additionally, there may be provision for providing, essentially parallel to the sliding portions, a guide rail which is spaced apart on the crossmember and which cooperates with stabilizing elements, arranged on the handles, for stabilizing the movement of the handles. The term "stabilization of the movement of the handles" is to be understood here as meaning that, when the device is in use, the handles can be moved essentially only along the sliding axes defined by the sliding portions, even in the event of strong forces acting on said handles.

With the proviso of the symmetry with respect to the steering plane of symmetry, it is conceivable for the sliding portions to have both a strictly rectilinear and a slightly curved design.

In a further variant of the drive device, the symmetrical movement of the handles is implemented via symmetrical lever movements. For this purpose, the first and the second handle are designed as an end portion of a first and of a second lever arm, the lever arms being articulated on the steering gear in such a way that the first and the second handle can be pivoted essentially adjacently to the crossmember.

In each case the coupling means having the coupling points for the force transmission train is arranged on the lever arms. In this case, it may be advantageous to mount the coupling points movably with respect to the coupling means in such a way that the handle guide path, necessarily curved due to the lever movement, entails a less highly curved drive guide path of the coupling points. For this purpose, the coupling points are mounted on the coupling means so as to be displaceable within a defined deflection range along an axis which extends parallel to the direction of extent of the levers. The movement of the coupling points on the drive guide paths is designed essentially rectilinearly according to the above definition both for a movable and for a fixed mounting of the coupling points.

Preferably, there is provision, in the case of a fork which has a fork head in a known way, for the lever arms to be articulated symmetrically with respect to the steering plane of symmetry in the region of the fork head. However, another type of positioning of the lever arms, for example in the region of the steering shaft, may likewise be envisaged.

A further variant of the device according to the invention provides positive guidance between the first and the second handle without the use of a coupling portion, acting between the two coupling means, of the force transmission train.

For this purpose, the handles are designed as end portions of a first and of a second lever arm of L-shaped design. The lever arms are arranged symmetrically with respect to the steering plane of symmetry and are in each case pivotable about a pivot axis running outside the steering plane of symmetry. This pivot axis is preferably arranged in the angled region of the L-shaped lever arms. By means of the end portions, facing away from the handles, of the two L-shaped lever arms, these are mounted in a common bearing means arranged in the region of the steering plane of symmetry, in such a way that the pivoting movement of one lever arm necessarily induces a symmetrical pivoting movement of the other lever arm due to the bearing means. In order to convert the pivoting movement of the lever arms into a drive movement of the guided wheel, the coupling means of the force transmission train are arranged adjacently to the bearing means on the lever arms. This arrangement of the coupling means is preferably designed symmetrically with respect to the steering plane of symmetry.

It goes without saying that this variant of the invention is not necessarily tied to a "strict" L-shaped geometry of the two lever arms. It is also conceivable for the lever arms to have a curved design, the steering axes in each case being arranged symmetrically between the end portions of the curved lever arms, in order to convert the pivoting movement of the end portions provided at one end of the handles into a pivoting movement of the assigned other end portions.

Preferably, the guide means has a U-shaped downwardly bent crossmember which is arranged symmetrically with respect to the steering plane of symmetry. In this case, the two lever arms are articulated in the region of their pivot axes on the two legs of the crossmember which point downward in the direction of the drive means.

Since the force transmission train has no coupling portion performing between the first coupling means and the second coupling means, the force transmission train is fixed with a first end and a second end in relation to the crossmember in each case at a first fixing point and at a second fixing point. In this case, the fixing points are arranged opposite one another in relation to the bearing means of the lever arms. Preferably, the force transmission train is fixed with its first end to the fork and/or the steering shaft at the first fixing point between the lever arms and the drive means. Starting from this fixing point, the force transmission train extends via the first coupling element in the form of a first force deflection element to the drive means and in this case forms the first force transmission portion. The second end of the force transmission train is fixed to the steering shaft and/or to the crossmember at a second fixing point, the force transmission train extending from the second fixing point via the second force deflection element to a force transmission deflection element, fixed to the crossmember, and from there to the drive means. The force transmission train in this case forms the second force transmission portion between the second force deflection element and the drive means.

A preferred variant of this embodiment is distinguished in that the force transmission train is fixed releasably to the steering gear at the first and at the second fixing point. The ends of the force transmission train can be released from the steering gear by means of a respectively assigned changeover means and can be fixed to regions, running adjacently to the fixing points, of the force transmission portions of the force transmission train. Due to the release of the fixing of the ends of the force transmission train, the force transmission train runs in the form of a fixed loop around the coupling means designed as force deflection elements. A pivoting of the coupling means is therefore transmitted to the force transmission train in the ratio 1:1. By contrast, if the ends of the force transmission train are fixed at the fixing points, the pivoting of the coupling means results in only half as great a movement of the force transmission train, because the force deflection elements act as "loose" deflection elements in the same way as the loose pulleys of a block and tackle. Thus, by such a deflection means, a change in the step-up of the hand-operated drive device can be implemented in a simple way.

It is advantageous if a locking means of the handles is provided. The movement of the handles can thereby be blocked in a position in which the above-described release of the fixing points and the fastening of the released ends to the adjacently running regions are possible in a simple way. This applies correspondingly to the following variants of the drive means with a step-up change provided.

However, a locking means for blocking the handle movement is also advantageous entirely independently of the possibility of change in the step-up. It may be desirable to be able to block the movement of the handles. This applies to all the variants of the hand-operated drive device.

The bearing means of the two lever arms is preferably designed as a slot in the form of a long hole, arranged in the end portion of the first lever arm, and a guide bolt provided on the end portion of the second lever arm and arranged displaceably in the slot. A multiplicity of further variants for the design of the bearing means may be envisaged. It is in each case essential only that the bearing means brings about a symmetrical movement of the two handles.

The various embodiments of the hand-operated drive device which were described above can in each case be combined with a multiplicity of drive means for the guided wheel which are described below.

An advantageous first variant of such a drive means comprises a first torque transmission means provided on one side of a hub of the guided wheel and provided with a freewheel and, on the other side of the hub, a second torque transmission means provided with a freewheel. In this case, the force transmission train or an extension train fastened to the force transmission train so as to transmit tractive force runs from the first torque transmission means to the second torque transmission means by a change deflection element arranged on the steering gear.

The force transmission train is in this case guided in such a way that, during a movement of the train in a first direction, the first torque transmission means transmits a torque to the wheel in the driving direction of rotation and at the same time the second torque transmission means rotates freely in the freewheel direction of rotation. During the change in direction of movement of the force transmission train, the second torque transmission means correspondingly transmits a torque in the driving direction of rotation and the first torque transmission means rotates freely.

It is also conceivable that the two torque transmission means are mounted such that the two force transmission portions are arranged on the same side of the axis of rotation of the guided wheel. This may be required particularly when a disk brake means is already arranged on one of the two sides and therefore leaves little construction space for a torque transmission means. The change deflection element in such a case serves merely for guiding the force transmission train between the two torque transmission means. In this case, no "side change" of the force transmission train takes place between the two ends of the hub of the guided wheel.

The region of the force transmission train or of the extension train between the first and the second torque transmission means is designated below as the change portion. The force transmission train or the extension train is in each case connected operatively to the first and the second torque transmission means. In the region of the change portion, the force transmission train or the extension train is guided from the first to the second torque transmission means in such a way that a movement of the force transmission train in the first direction of movement gives rise to force transmission via the first torque transmission means to the guided wheel and at the same time to an actuation of the freewheel of the second torque transmission means opposite to the driving direction of the second torque transmission means. A reversal of the direction of movement of the force transmission train then correspondingly results in the fact that a drive force can be transmitted to the guided wheel by the second torque transmission means and at the same time the freewheel of the first torque transmission means is actuated.

The design of the torque transmission means depends on whether that active portion of the force transmission train which is connected operatively to the torque transmission means is designed as a rope, a chain or a toothed belt. If the active portion is designed as a chain, the assigned torque transmission means can in a simple way be designed as a chain wheel.

In a further variant, at least one torque transmission means is designed in the form of a rope drum element. These torque transmission means are arranged coaxially with respect to the axis of rotation of the wheel either on the two sides of the hub of the guided wheel or both on the same side of the guided wheel of the hub. The force transmission train or the extension train loops at least partially around the surface areas of the rope drum elements. Preferably, one rope drum element has on the surface area a spiral groove, the cross section of which is U-shaped, in which case the radius at the bottom of the U-shaped groove should be smaller than half the diameter of the force transmission train or extension train designed as a traction rope.

In this case, a mechanical clamping means may be provided, which ensures a tractive force-transmitting connection between the force transmission train or extension train and the rope drum element. If a mechanical clamping means is provided, it is located approximately in the middle of the rope drum element and the force transmission train or the extension train loops around the rope drum element with more than double the length with which the train is moved due to a maximum deflection of the handles.

If the materials of the train and of the rope drum elements are suitably selected in such a way that the frictional connection of the train to the rope drum element is ensured for all the tractive forces which occur, the use of a clamping means may even be dispensed with.

Regardless of whether the first or the second torque transmission means is designed in the form of a chain wheel or in the form of a rope drum element or as a combination of these two variants, it may be advantageous if these have diameters different from one another. The user of the device according to the invention can exert a greater force when the handles are pushed together than when they are drawn apart from one another because of the anatomy of the human body. In such a case, the different diameters of the torque transmission means ensure that, when the handles are drawn apart from one another, in spite of the lower force applied, a torque equal to that occurring when the handles are pushed together can be transmitted to the guided wheel.

A further advantageous variant of the device having this drive means provides for designing the force transmission train or the extension train, in the region of the change portion between the first and the second torque transmission means, at least partially to be elastically stretchable. It is thereby possible to provide the device according to the invention in steering gears, of which the extent along the steering axis is variable by a springing means. Springing means of this type are arranged, for example on bicycles, in a known way on forks, fork heads or the transition between the steering shaft and fore-part.

During the compression of such a springing means, the force transmission portions are necessarily shortened. The elasticity of the change portion is designed in such a way that the tractive force of the change portion can absorb the length of the force transmission portions which is released due to the compression of the springing means. In this case, the torque transmission means which is not acted upon by a drive force rotates in the freewheel direction. If no force is exerted on the steering handles, the two torque transmission means rotate in the freewheel direction, driven by the tractive force of the elastic change portion. During the rebound of the springing means, the force transmission portions of the force transmission train can assume their original length only by driving the front wheel in the direction of travel. The drive means thus acts at the same time as damping for the springing means, the oscillation energy being converted partially into the propulsion of the guided wheel.

The above statements apply similarly to situations where, additionally or alternatively to an at least partial elastic design of the force transmission train or of the extension train in the region of the change portion, the assigned change deflection element is arranged on the steering gear in such a way that it can be deflected elastically essentially along the direction of extent of the change portion.

In a further variant of the device having the above-described drive means, the first force transmission portion is guided with its end portion in each case adjacent to the extension train around a deflecting pulley and is fixed to the steering gear in the region between the deflecting pulley and change deflection element by a coupling means. The deflecting pulleys therefore ensure a tractive force-transmitting connection between the force transmission train and the assigned extension train in the function of loose pulleys. A step-up in the ratio 2:1 between the movement of the force transmission train and the movement of the extension train is thereby implemented.

It is particularly advantageous to design the coupling means and those regions of the force transmission portions which are adjacent to the coupling means in each case in such a way that the fixing of the force transmission train to the steering gear can be released and the end portion of the force transmission portion is arranged in the form of a loop around the assigned pulley. In this way, the functionality of the deflecting pulleys as "loose" pulleys can be canceled, so that a step-up ratio 1:1 with respect to the movements of the force transmission train and the extension train is achieved.

This variant is a variant for the provision of variable step-ups which is more cost-effective and simpler, as compared with hubs and chain shifts. It is nevertheless also conceivable to design the hubs of the guided wheel with chain or hub shifts in all the exemplary embodiments of the drive device which are described.

A further variant of the device provides a drive means in the form of a gearing means which is arranged at one end of the hub of the guided wheel and to which the first force transmission portion and the second force transmission portion of the force transmission train are coupled. This gearing means is designed in such a way that the alternating movement of the first and of the second force transmission portion which is induced by the alternating movement of the handles gives rise, for each direction of movement of the force transmission train, to torque transmission to the guided wheel.

A design variant of such a gearing means provides a first drive chain wheel arranged on the hub of the guided wheel and cooperates with the force transmission train and which has a freewheel opposite to the driving direction of the guided wheel. A first gearwheel is arranged, offset axially with respect to the first drive chain wheel, on the hub. This first gearwheel meshes with a second gearwheel arranged so as to be offset laterally with respect to the first gearwheel, the second gearwheel having a second drive chain wheel arranged so as to be spaced apart axially from it and coupled to the force transmission train. The force transmission train, which is designed in the region of the first and of the second chain wheel in the form of a chain, thus moves both the first and the second drive chain wheel in the same direction. When the force transmission train moves the first drive chain wheel in the driving direction, the second drive chain wheel runs in freewheel. When the force transmission train moves in the opposite direction, the first drive chain wheel runs in freewheel and the second drive chain wheel drives the assigned second gearwheel which, in turn, meshes with the first gearwheel. The rotational movement of the second drive chain wheel is thereby applied as propulsion to the guided wheel via the two assigned gearwheels.

As already presented above, the user of the hand-operated drive device applies different forces when the handles are pressed together and are drawn apart from one another. By suitable selection of the two gearwheels, a step-up convenient for the user can be set, so that, in spite of a lower force, an essentially identical torque is applied as propulsion to the guided wheel when the handles are drawn apart from one another.

A further variant of the drive device has, on the end portions, facing the guided wheel, of the first and of the second force transmission portion, a first and a second chain wheel which are in each case suspended on the chain wheel axis of rotation by means of a holding device. The drive means has a chain, cooperating with the two chain wheels, with two ends, which extends from its first end, fixed to the steering gear between the axis of rotation and the first chain wheel, via the first chain wheel around a drive chain wheel arranged on the axis of rotation and having a freewheel and back around the second chain wheel to the second end fixed to the steering gear between the axis of rotation and the second chain wheel. By the chain ends being fixed to the steering gear, the first and the second chain wheel function as "loose" pulleys. That is to say, a length change of the first and second force transmission portions coupled to the chain wheels is converted in the ratio 2:1 into a length change of the chain of the drive means, said chain cooperating with the chain wheels.

To change the step-up, it is particularly advantageous if the ends of the chain are fastened releasably to the steering gears, the chain ends having coupling means which allow a coupling to adjacent chain portions in such a way that the end portions of the chain in each case form a closed loop around the chain wheels. The function of the chain wheels as "loose" pulleys is thereby canceled. The step-up with respect to the length change of the force transmission train and of the chain of the drive means amounts in such a case to 1:1.

In the variant described above, force is applied to the guided wheel only in one direction of movement of the handles. It is therefore advantageous to provide a spring element which, in the opposite direction of movement of the handles, is compressed and therefore stores the force introduced. The latter is then released again during the opposite movement of the handles and is thus converted into the propulsion of the guided wheel.

The above-described variant of the drive means can also be implemented, instead of by chains and "loose" pulleys designed as chain wheels, by Bowden cables or toothed belts and loose pulleys in the form of rope pulleys or pinions for toothed belts.

A further variant of the hand-operated drive device according to the invention is characterized in that the guide means has a second force transmission train which is guided, essentially parallel to the first force transmission train and so as to be offset with respect to the latter, with specific assigned deflection elements between the coupling means and the drive means and is coupled to the first and to the second coupling means in such a way that the movement of the handles causes a movement, corresponding to the first force transmission train, of the second force transmission train.

If, as already presented above, torque transmission means are provided on the hub of the guided wheel, the first force transmission train cooperates for force transmission with the first torque transmission means and the second force transmission train cooperates for force transmission with the second torque transmission means. It is therefore no longer necessary in this case to provide a change deflection element in order to lead the force transmission train or an extension train coupled to the latter from the first torque transmission means to the second torque transmission means in a change portion.

It is possible to arrange the two torque transmission means both on one and the same side of the hub of the guided wheel and on its opposite sides symmetrically with respect to the steering plane of symmetry.

As already stated, it is possible to design the two torque transmission means provided on the hub of the guided wheel both as chain wheels and as rope drum elements or as belt pulleys. A combination of these variants with one another is also possible.

The above statements regarding a different diameter between the oppositely arranged torque transmission means apply correspondingly to the design variant having two parallel-guided force transmission trains.

All the variants of the various drive devices described can, of course, be combined with the different variants of the drive device, unless specified otherwise.

BRIEF DESCRIPTION OF THE DRAWINGS

Further advantages and features of the invention are explained in connection with the description of the following exemplary embodiments in the figures in which.

DETAILED DESCRIPTION OF PREFERRED EMBODIMENTS

Figure 1:
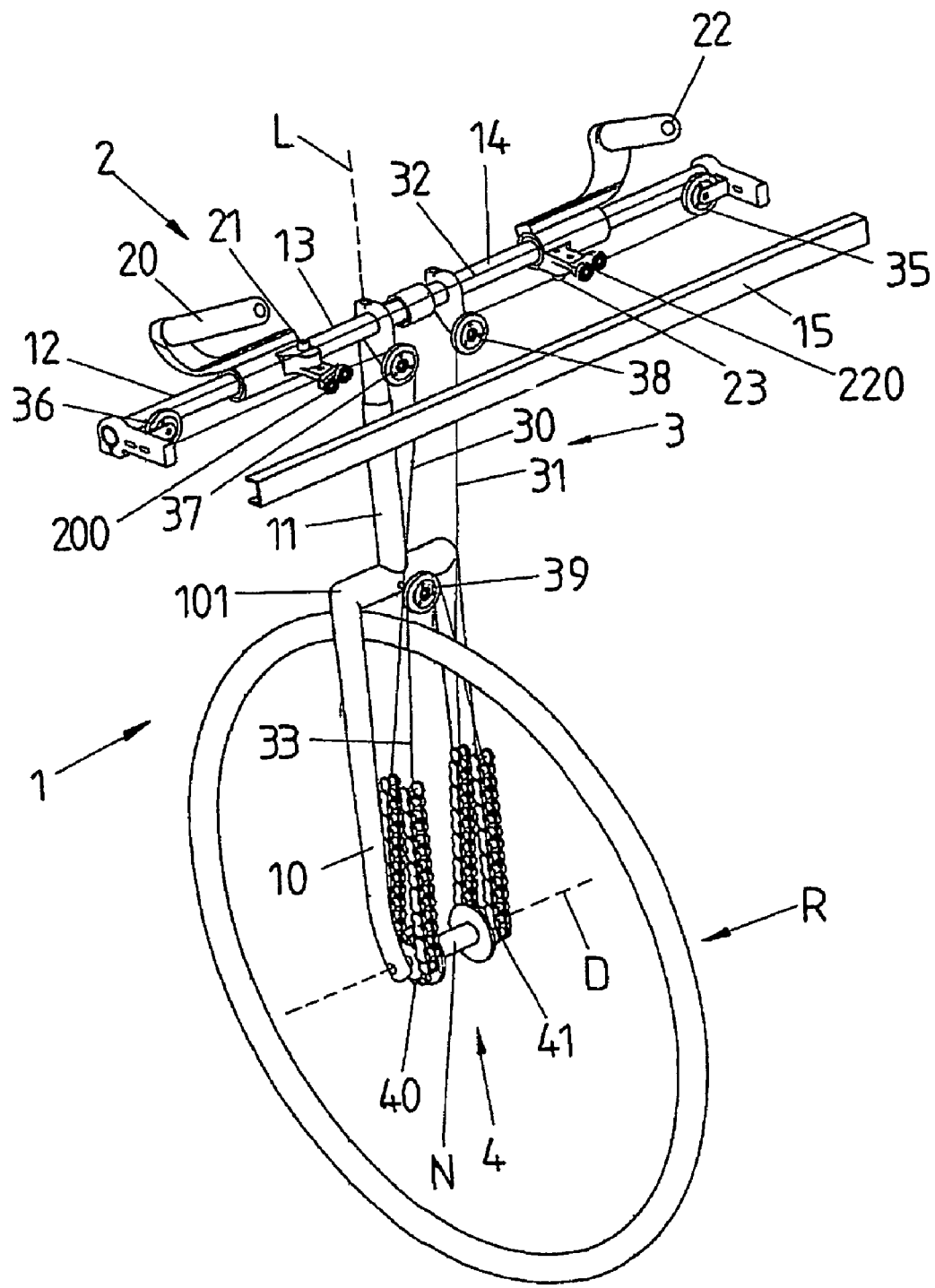
FIG. 1 shows a first variant of the hand-operated drive device according to the invention.

FIG. 1 shows a first embodiment of the device for hand-driven operation of a guided wheel R which is arranged on a steering gear 1 and which is pivotable about a steering axis L oriented perpendicularly with respect to the axis of rotation D of the guided wheel. A hand-operated drive device of this type is used particularly in a front wheel of a commercially available bicycle known from the prior art. In the pictorial illustration, therefore, for the sake of clarity, the remaining components of such a bicycle have not been shown, since these are in any case known from the prior art.

The guided wheel R with its axis of rotation D is arranged in a known way in a fork 10 of the steering gear 1 by means of a wheel hub N. The fork 10 has a fork head 101 which is designed symmetrically with respect to the axis of the steering shaft 11 which extends along the steering axis L upwardly, that is to say away from the guided wheel R.

A crossmember 12 oriented transversely with respect to the steering axis L is fastened to the steering shaft 11, for example via a fore-part. In this first exemplary embodiment, this crossmember 12 is designed as a rectilinear tubular element. The crossmember 12 is arranged symmetrically with respect to a steering plane of symmetry in which the steering axis L lies and which is oriented perpendicularly with respect to the axis of rotation D of the guided wheel R.

A first handle 20 and a second handle 22 are arranged on the crossmember 12 on the right and left of the steering plane of symmetry. The handles 20, 22 extend essentially in the direction of travel of the guided wheel R and are angled slightly upward.

It goes without saying that other orientations of the handles are also possible. The handle position is normally selected such that a rider of the bicycle can conveniently exert force on the handles in order to move these parallel to the steering plane of symmetry. The handles are preferably in this case oriented mirror-symmetrically with respect to the steering plane of symmetry.

The first and the second handle 20, 22 have in each case a coupling means 21, 23 which fulfils various functions. On the one hand, the handles 20, 22 are coupled to the crossmember 12 via the assigned coupling means 21, 23. For this purpose, the coupling means 21, 23 surround the crossmember 12 in such a way that a displacement of the handles along the axis of extent of the crossmember 12 is possible. On the other hand, the coupling means 21, 23 ensure the fixing of a force transmission train 3 via coupling points. As a result, a tractive force-transmitting connection between the force transmission train 3 and the coupling means 21, 23 and therefore indirectly also the handles 20, 22 is made.

The force transmission train 3 is produced at least partially, in particular, from a high-strength lightweight rope with a core consisting of preoriented polypropylene.

The coupling means 21, 23 cooperate as a guide means 2 with the crossmember 12 in order to ensure a movable mounting of the handles 20, 22.

In the embodiment shown in FIG. 1, the crossmember 12 is designed as a tube of circular cross section. The coupling means 21, 23 in this case surround this tubular cross section in such a way that a displacement of the coupling means 21, 23 along the axis of extent of the crossmember 12 with low friction is possible. This displacement takes place along sliding portions 13, 14 which are arranged as portions of the crossmember symmetrically with respect to the steering plane of symmetry.

In order, in addition to the axial movement of the coupling means 21, 23, to prevent a rotation of the coupling means 21, 23 about the axis of extent of the crossmember 12, a guide rail 15 is arranged parallel to the crossmember 12. The guide rail 15 is coupled rigidly to the crossmember 12 via two longitudinal struts fastened to the ends of the crossmember 12. The guide rail 15 has in cross section a U-profile which is open in the direction of the crossmember 12. Stabilizing means 200, 220 projecting into the guide rail 15 slide in each case in this U-profile from each coupling means 21, 23. The stabilizing means 200, 220 thus, in cooperation with the guide rail, prevent a radial rotation of the coupling means 21, 23 or of the handles 20, 22 around the crossmember 12. In order to ensure an easy sliding of the stabilizing means 200, 220 in the guide rail 15, it is advantageous to design the stabilizing means 200, 220 with ball bearings.

The subassembly consisting of handles, coupling means and stabilizing means is produced in a weight-saving manner, in particular, from carbon fiber laminate.

It is, of course, conceivable to provide a guide rail 15 having a differently shaped cross section. It is essential merely that the stabilizing elements 200, 220 support the coupling means 21, 23 in the function of a supporting lever in such a way that a rotation of the coupling means 21, 23 is prevented. It would likewise be possible to dispense with a guide rail 15 if the cross-sectional geometry of the crossmember 12 per se prevents a rotation of the coupling means 21, 23 and of the handles 20, 22. It would also be conceivable that stabilizing means engage in the direction of the crossmember into a guide groove formed in the crossmember.

Starting from the first coupling means 21 arranged on the left of the steering plane of symmetry in FIG. 1, the force transmission train 3 extends, parallel to the direction of extent of the crossmember 12, to the first end, arranged on the left of the steering plane of symmetry, of the crossmember 12. A force transmission deflection element 36 in the form of a deflecting pulley is provided there. This deflecting pulley is arranged on the first longitudinal strut in such a way that the force transmission train 3 coming from the coupling point of the first coupling means 21 is deflected through essentially 180°. The force transmission train therefore runs back again, past the first coupling means 21, to a first force deflection element 37 likewise designed as a deflecting pulley. This force deflection element 37 is fixed, next to the first sliding portion 13 of the crossmember 12, to said crossmember 12. This deflection element 37 changes the direction of extent of the force transmission train 3 essentially through 90° and deflects the train 3 in the direction of the hub of the guided wheel R.

Starting from the coupling point of the first coupling means 21, the force transmission train 3 runs in the other direction likewise essentially parallel to the direction of extent of the crossmember 12, past the second coupling means 23, to the second end of the crossmember 12 having the second longitudinal strut. A coupling deflection element 35 in the form of a deflecting pulley is mounted symmetrically with respect to the steering plane of symmetry on this second longitudinal strut. This deflection element 35, in turn, changes the direction of extent of the force transmission train 3 essentially through 180°, so that the latter passes back to the second coupling means 23. At the coupling means 23, the nonpositive connection between the force transmission train 3 and the second coupling means 23 is ensured by a coupling point. The force transmission train 3 is then led further on in the direction of the steering plane of symmetry to a second force deflection element 38. This second force deflection element 38 is likewise designed in the form of a deflecting pulley and is fastened to the crossmember symmetrically with respect to the steering plane of symmetry in relation to the first force deflection element 37. This second deflecting pulley 37, too, deflects the force transmission train 3 essentially through 90° in the direction of the hub of the guided wheel R.

Since the force transmission train 3 extends in a coupling portion 32, via the coupling deflection element 35, from the coupling point of the first coupling means 21 to the coupling point of the second coupling means 23, there is a nonpositive connection between the two handles 20, 22. This nonpositive connection in a simple way brings about a movement, symmetrical with respect to the steering plane of symmetry, of the two handles 20, 22 along the two sliding portions 13 and 14.

From the coupling point of the first coupling means 21, the force transmission train 3, on its way via the force transmission deflection element 36 and the first force deflection element 37 as far as the drive means 4 arranged in the region of the hub of the guided wheel R, forms a first force transmission portion 30.

Correspondingly, the force transmission train 3, on its way from the coupling point of the second coupling means 23 via the first force deflection element 37 as far as the drive means 4 arranged in the region of the hub of the guided wheel R, forms a second force transmission portion 31.

The positive coupling implemented via the coupling portion 32 of the force transmission train 3 ensures a symmetrical movement of the two handles 20, 22 with respect to the steering plane of symmetry when these are moved apart from one another. The positive coupling implemented by the non-positive coupling of the two force transmission portions 30, 31 leads correspondingly to the symmetrical movement of the handles 20, 22 when these are pressed together. In this case, the length change of the first force transmission portion 30 induced in each case by these handle movements is accompanied by an opposite length change of identical amount of the second force transmission portion 31.

The first and the second force transmission portion 30, 31 run in each case partially as a link chain in the region of the drive means 4. As a result, the force transmission train 3 cooperates with first and second torque transmission means 40, 41 designed as drive chain wheels. The first drive chain wheel 40 is in this case on one side of the hub N of the guided wheel R, and the second drive chain wheel 41 is in a symmetrical arrangement on the opposite wheel side. Each of the two drive chain wheels 40, 41 has, opposite to the driving direction of the guided wheel, a freewheel on the axis of rotation D of the hub N.

The force transmission train 3 runs with its two chain portions around the two drive chain wheels 40, 41 and up to the fork head 101. Along this path, the force transmission train 3 is again designed as a train portion. At the fork head 101, a change deflection element 39 in the form of a deflecting pulley deflecting the force transmission train 3 is arranged. The change deflection element 39 deflects the force transmission train from that flank of the first drive chain wheel 40 which is oriented forward in the direction of travel to that flank of the second drive chain wheel 41 which is oriented forward in the direction of travel. The portion of the force transmission train between these two flanks of the drive chain wheels 40, 41 is designated as a change portion 33.

The change from one torque transmission means to the other takes place in such a way that, during a movement of the force transmission train 3, one of the two drive chain wheels 40, 41 is moved in the driving direction of rotation of the wheel R and the other drive chain wheel in each case is moved in the freewheel direction.

Figure 2:
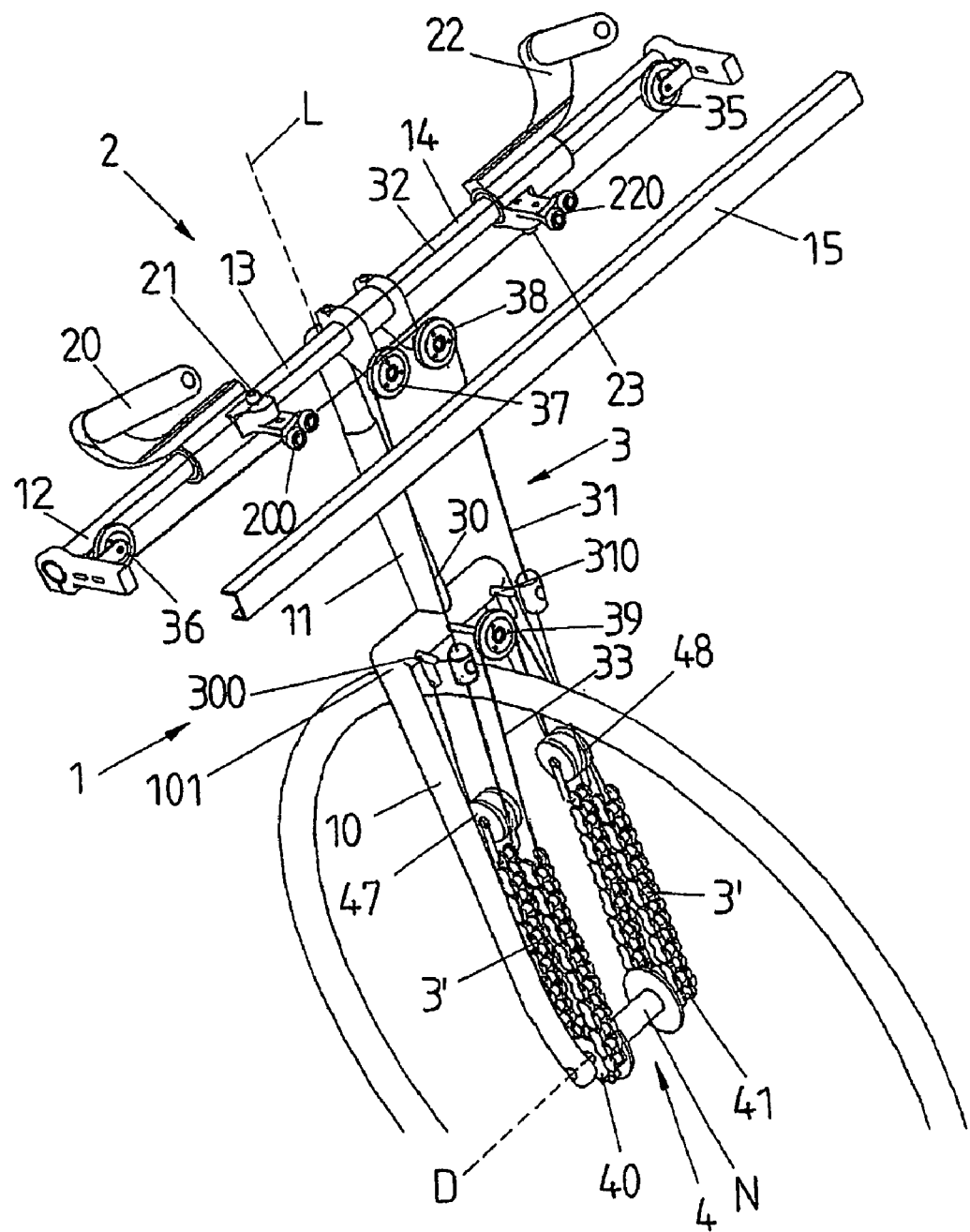
FIG. 2 shows the first variant according to FIG. 1 in combination with a differently configured drive means.

FIG. 2 shows essentially the first variant of the hand-operated drive device according to FIG. 1 in combination with a differently configured drive means 4. Identical reference symbols are therefore used for the same structural elements. Reference is made to the preceding description in so far as there is no different design.

The only difference from the hand-operated drive device of FIG. 1 is that the force deflection elements 37, 38 are arranged in such a way that the first force transmission portion 30 runs partially parallel and adjacently to the second force transmission portion 31, that is to say, before the two force transmission portions are deflected toward the wheel R, they run through the steering plane of symmetry, in contrast to FIG. 1. It is clear that the arrangement of the force deflection elements 37, 38 depends on the design of the drive means 4 and on the geometry of the fork 10. A multiplicity of fork variants are known from the bicycle sector and in each case necessitate different drive means 4 with different geometries in terms of the guidance of the force deflection train 3.

The drive means 4 according to FIG. 2 is designed symmetrically with respect to the steering plane of symmetry in the same way as the drive means described above. The first force transmission portion 30 runs in the direction of the hub N of the wheel R and in this case forms a loop around a deflecting pulley 47, the end of the first force transmission portion 30 being fixed to the fork head 101 by a coupling means 300. The axis of rotation of the deflecting pulley is arranged essentially parallel to the axis of rotation D of the guided wheel and is connected to an extension train 3' via a yoke so as to transmit tractive force.

This extension train 3' runs first with a first chain portion around a first drive chain wheel 40 designed as illustrated in FIG. 1. Thereafter, the extension train 3' is deflected from the first side of the wheel R to its second side by means of a change deflection element 39 according to FIG. 1. In this case, the extension train 3' forms the change portion 33 of the force transmission train 3.

The first and the second deflecting pulley act in each case as loose pulleys in such a way that the length change of one of the two force transmission portions 30, 31 is transferred, halved, to the extension train 3'. A step-up in force transmission between the handles and the axis of rotation D of the guided wheel R is consequently achieved in a simple way.

The two coupling means 300, 301 allow a release of the first and second force transmission portions 30, 31 fixed in each case and a coupling of the free ends to adjacently guided regions of the respective force transmission portion 30, 31, in such a way that the functionality of the deflecting pulleys 47, 48 as loose pulleys is canceled. Force transmission then takes place in the ratio 1:1. For this purpose, at the adjacent regions of the respective force transmission portions 30, 31, couplers are provided which allow a connection to the ends of the force transmission portions 30, 31. These couplers preferably act purely mechanically, for example by means of a plug and/or latch mechanism.

Figure 3:
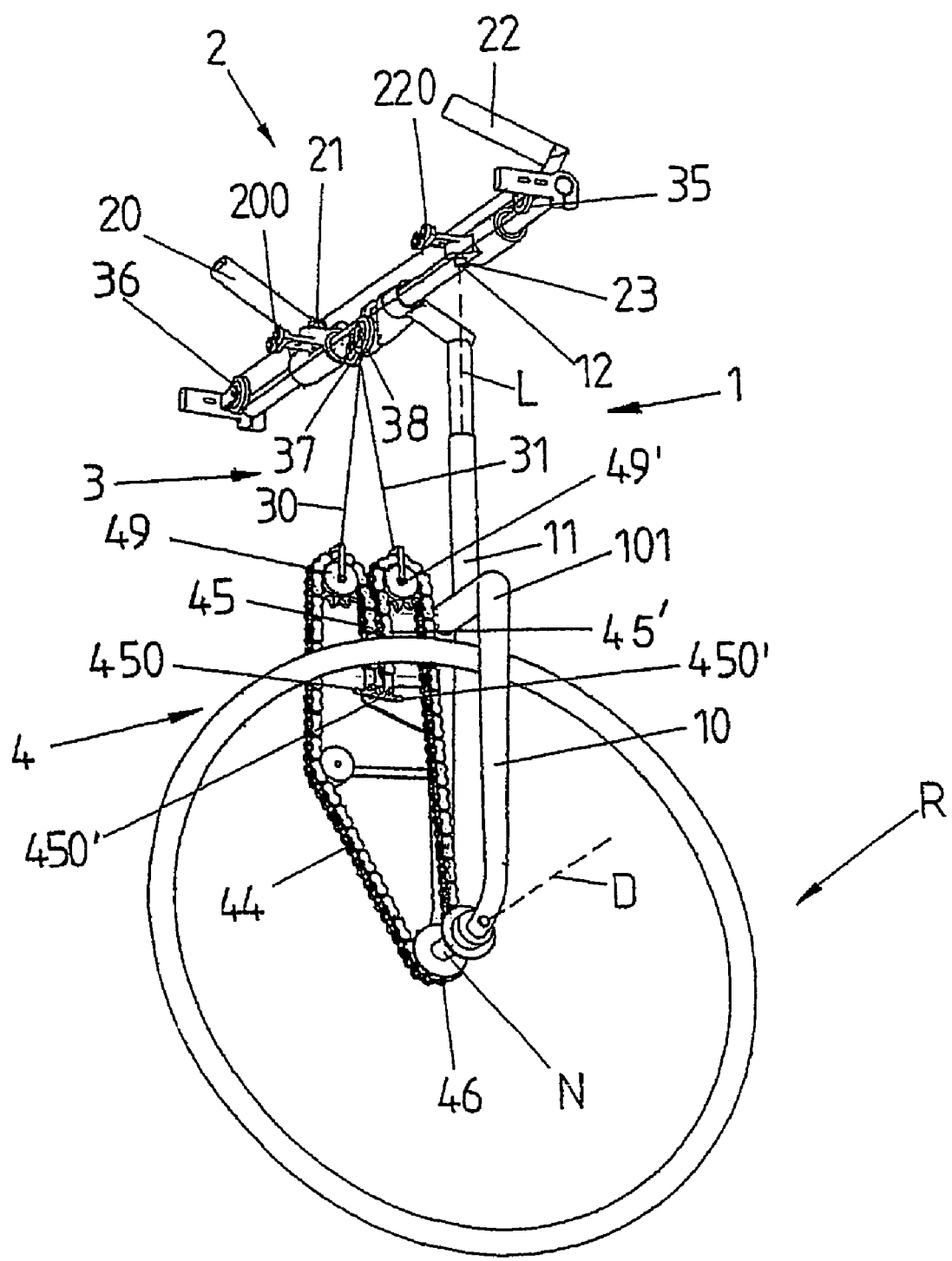
FIG. 3 shows the first variant of the device according to FIGS. 1 and 2 in combination with a second variant of a drive means.

FIG. 3 shows the first variant of the hand-operated drive device according to FIGS. 1 and 2 in combination with a second variant of a drive means.

In a similar way to the drive device 4 according to FIG. 2, the first and the second force transmission portion 30, 31 are coupled in each case to a loose chain wheel 49, 49'. In this case, however, the two force transmission portions 30, 31 are coupled to the axes of rotation of the two chain wheels 49, 491 in each case via a holding yoke. The two chain wheels 49, 491 are arranged on one side of the wheel R. This means that the two force deflecting pulleys 37, 38 are arranged on one side of the steering plane of symmetry and therefore not symmetrically on the crossmember 12.

The two chain wheels 49, 49' are connected operatively in each case to an extension train in the form of a link chain 44. The first and the second end 45, 46 of the chain 44 are fastened in each case to the fork 10 between the chain wheels 49, 49' and the hub N of the wheel R by coupling means 450, 450'. Starting from the coupling means 450, 450', the first end 45 of the chain 44 runs essentially parallel to the second end 46 in the direction of the chain wheels 49, 49'. The two chain wheels are held one behind the other in the direction of travel and parallel to the steering plane of symmetry by the force transmission portions 30, 31.

The two chain ends 45, 46 loop around the first and the second chain wheel 49, 49' and then run downward to the hub N of the wheel R. The two chain ends 45, 46 converge there around a drive chain wheel 46. The drive chain wheel 46 is arranged on the hub N with a freewheel correspondingly to the drive means from FIGS. 1 and 2.

In this embodiment of the drive means 4, force is transmitted in the propulsion direction of the wheel R when the handles 20, 22 are either drawn apart from one another or are pressed together. The crossmember 12 may have provided on or in it a spring device which is tensioned as a result of the movement of the handles 20, 22, during which no force is applied to the wheel R in the propulsion direction. This force is then released again in the propulsion direction during the handle movement.

In a similar way to FIG. 2, the first and the second chain wheel 49, 49' act in each case as loose pulleys, thus leading to a force step-up in the ratio 2:1. The coupling means 450, 450' in each case allow the release of the chain ends 45, 46 from the fork and the coupling of the ends 45, 46 to chain regions running adjacently to these, in such a way that force transmission takes place in the ratio 1:1.

Figure 4:
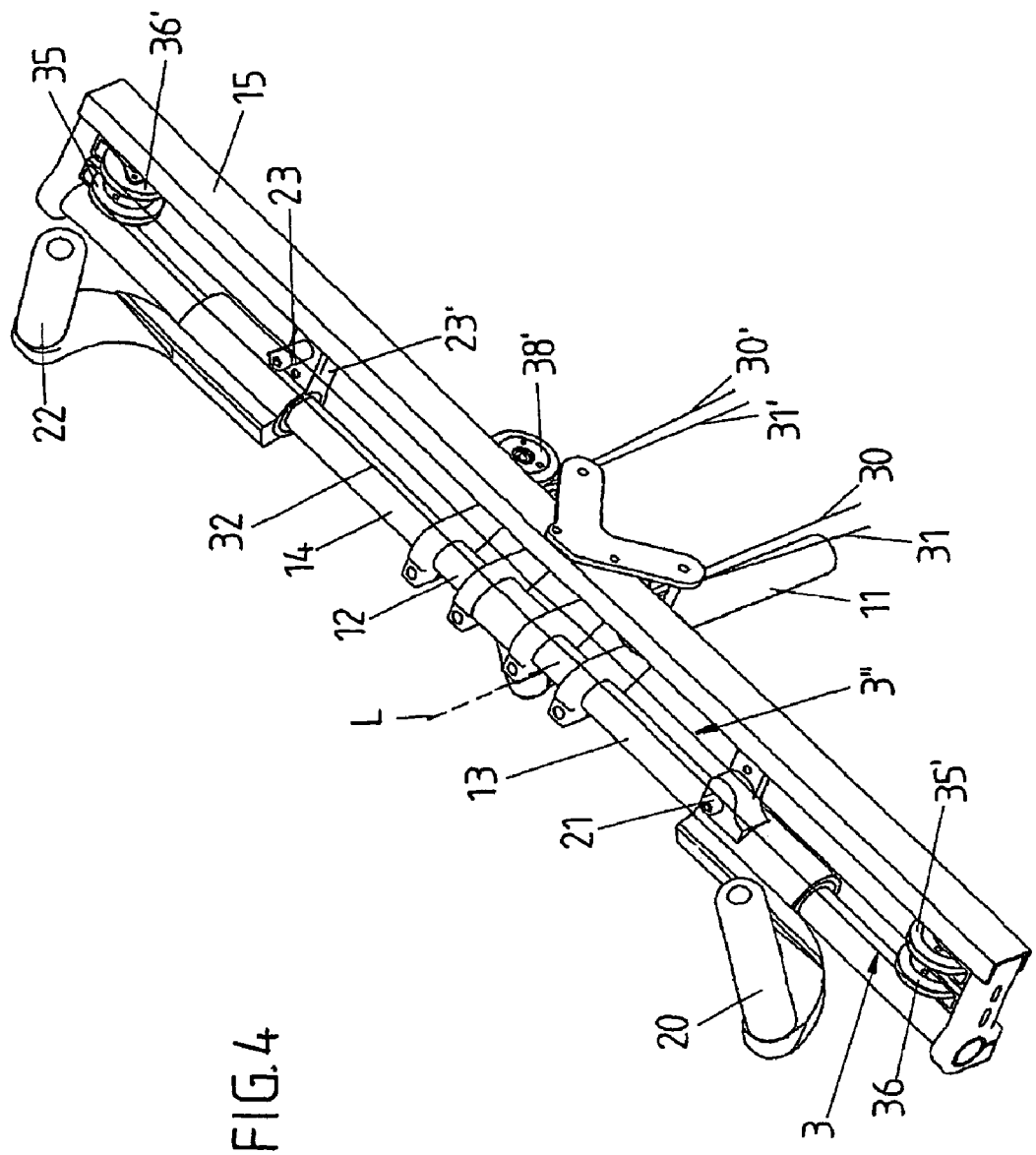
FIG. 4 shows a second variant of the hand-operated drive device with two force transmission trains.

FIG. 4 shows a second variant of the hand-operated drive device with two force transmission trains 3, 3".

A second force transmission train 3" is provided, parallel to the first force transmission train 3, via parallel-arranged coupling deflection elements 36, 36' and force transmission deflection elements 35, 35'. Correspondingly, twice as many force deflection elements are provided, in such a way as to deflect the first force transmission train 3 and the second force transmission train 3" in each case with its first and second force transmission portions 30, 31, 30', 31' in the direction of a drive means 4 provided in the region of the hub N of the wheel R. The force transmission portions 30, 31, 30', 31' can cooperate there in each case with an assigned torque transmission means.

In this variant, there is no need to deflect the single force transmission train or an extension train coupled to it from the first to the second torque transmission means by a change deflection element 39, as shown in FIGS. 1 and 2.

Figure 5:
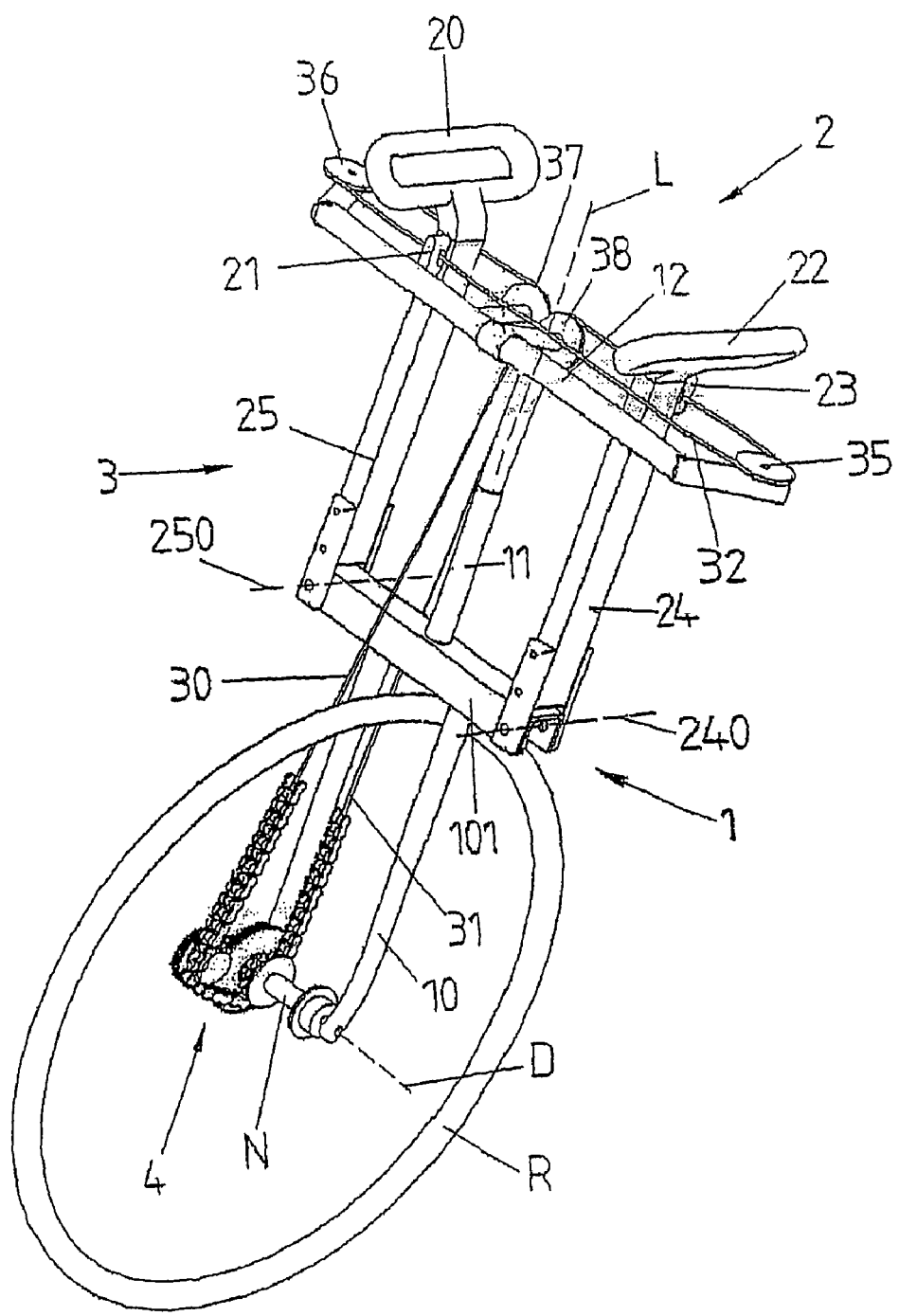
FIG. 5 shows a third variant of the hand-operated drive device with a drive means designed as a gearing means.

FIG. 5 shows a third variant of the hand-operated drive device with a drive means 4 designed as a gearing means.

Contrary to the previous hand-operated drive devices, the guide means 2 of this variant is designed in such a way that the handles 20, 22 are arranged at the ends of two lever arms 24, 25. The lever arms 24, 25 are articulated in the region of the fork head 101 and their pivot axes 240, 250 are arranged symmetrically with respect to the steering plane of symmetry. They extend essentially rectilinearly from the pivot axes 240, 250 to the handles 20, 22. A symmetrical movement of the handles 20, 22 which has guide paths in the form of a segment of a circle is thereby predetermined.

The two coupling means 21, 23 are provided adjacently to the handles on the levers 24, 25. The run of the force transmission train 3 and the arrangement of the deflection elements 35, 36, 37, 38 correspond essentially to those of the devices in FIGS. 1 and 2, the axes of rotation of the coupling deflection element 35 and of the force transmission deflection element 36 being oriented essentially parallel to the steering axis L. It is thereby possible to arrange the lever arms 24, 25 in such a way that, during their symmetrical pivoting movement, they run between the force transmission train which runs back and forth.

The coupling means 21, 23 are designed here in such a way that the coupling point of the force transmission train 3 can slip along the direction of extent of the respective lever arms 24, 25 in order to compensate the curvature of the guide paths, in the form of a segment of a circle, of the handles 20, 21. This results in essentially rectilinearly formed drive paths of the coupling points of the force transmission train 3.

The first and the second force transmission train 30, 31 are deflected onto the same side of the wheel R by the force deflection elements 37, 38. The two portions 30, 31 are connected operatively there to a drive means 4 in the form of a freewheel gearing.

Figure 6:
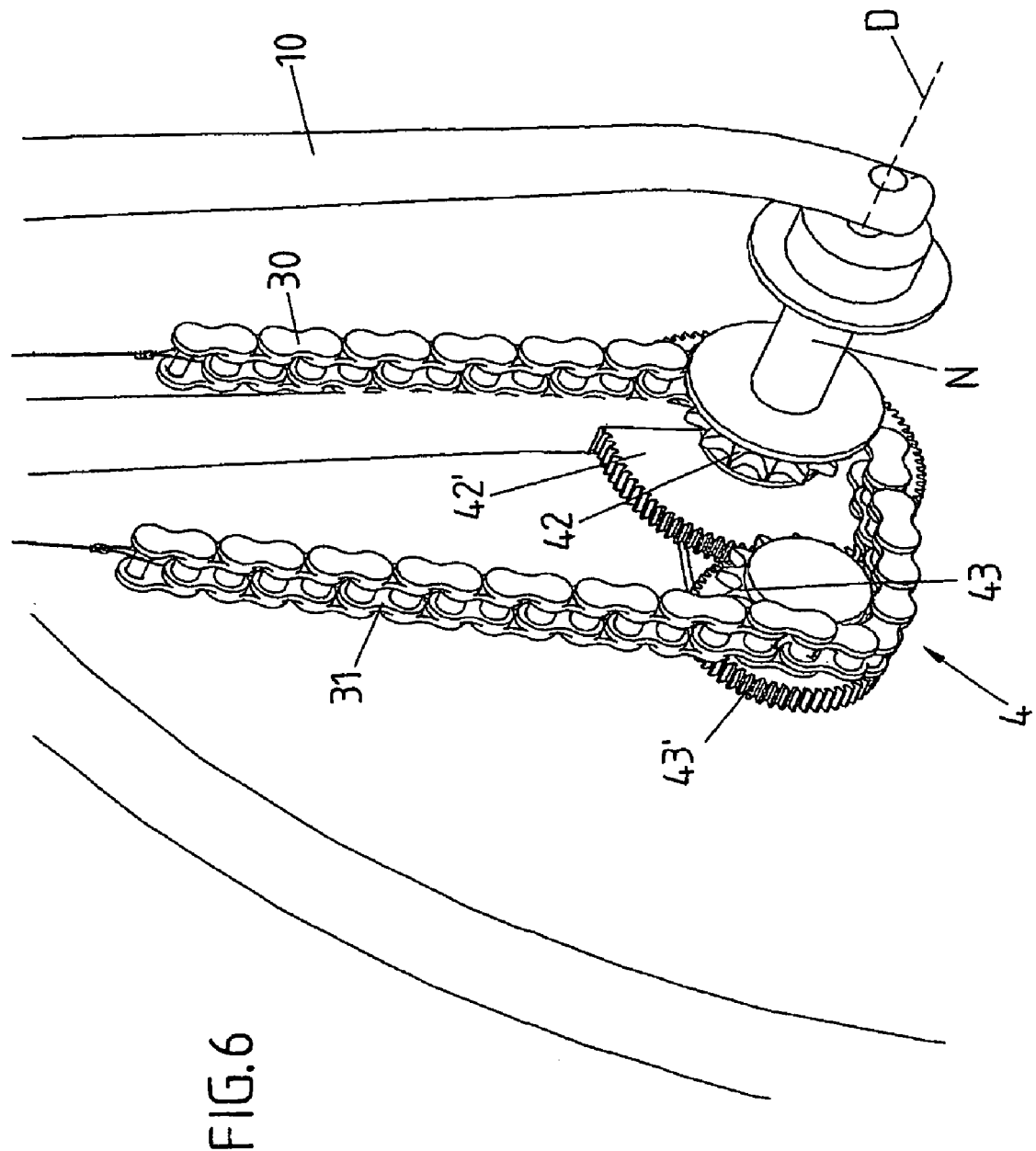
FIG. 6 shows the gearing means from FIG. 5 in detail.

The freewheel gearing 4 is illustrated in detail in FIG. 6. For the sake of clarity, the illustration of a gearing housing for encasing and fastening the gearing to the hub N of the wheel R has been dispensed with.

The first force transmission portion 30 runs in the form of a link chain portion to a first chain wheel 42 arranged on the hub N. The first chain wheel 42 has a freewheel opposite to the driving direction of rotation of the wheel R. A second chain wheel 43 with an essentially parallel axis of rotation is provided, spaced apart radially from the first chain wheel 42. This second chain wheel 43 likewise has a freewheel, but this is oriented opposite to that of the first chain wheel 42.

The first force transmission portion 30 runs around the first chain wheel 42 to the second chain wheel 43 and consequently merges into the second force transmission portion 31. A first and a second gearwheel 42' and 43' are provided, in each case spaced apart axially from the two chain wheels 42, 43. In the driving direction of the chain wheels 42, 43, these corotate the assigned gearwheels 42', 43' in the same direction. Opposite to the driving direction, the chain wheels and gearwheels run in each case freely with respect to one another. The gearwheels are arranged in such a way that the first gearwheel 43' meshes with the second gearwheel 42'. If, then, the force transmission train 3 moves clockwise, force is applied to the wheel R via the first chain wheel 42'. The second chain wheel 43 runs in freewheel. Counterclockwise, the first chain wheel 42 runs in freewheel and the second chain wheel 43 drives the second gearwheel 43' which, in turn, meshes with the first gearwheel 42'. The first gearwheel 42, is in this case driven in the propulsion direction of rotation of the wheel R and transmits force to the wheel R.

As illustrated in FIG. 6, desired force step-ups can be implemented by the selection of different diameters of the chain wheels 42, 43 and/or of the gearwheels 42', 43'. This takes into account the fact that a user can normally apply a lower force when the handles are drawn apart from one another than when they are pressed together.

Figure 7:
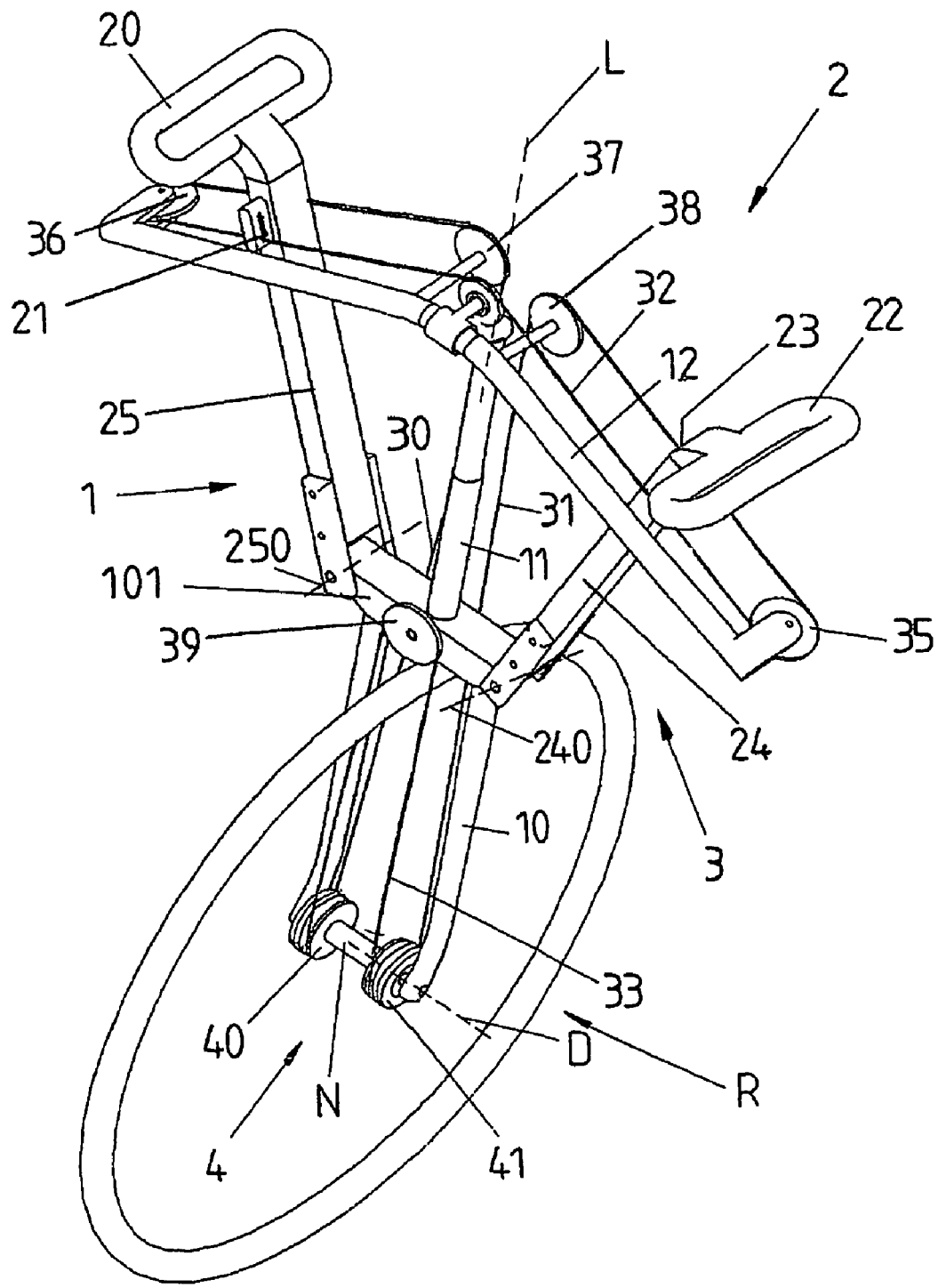
FIG. 7 shows a fourth variant of the hand-operated drive device.

FIG. 7 shows a fourth variant of the hand-operated drive device with a further variant of a drive means.

This hand-operated drive device corresponds essentially to the illustration from FIG. 5. The only difference is that the ends of the crossmember 12 run, bent downward toward the wheel, symmetrically with respect to the steering plane of symmetry.

The drive means 4 corresponds in terms of the operative principle and the construction geometry to the drive means shown in FIG. 1. The torque transmission means, however, are designed as rope drum elements 40, 41. The advantage of this is that the mass of drive chains in the overall mass of the parts with an alternating direction of movement is saved, and that the force transmission chain 3 can be designed continuously in the form of a rope.

Figure 8:
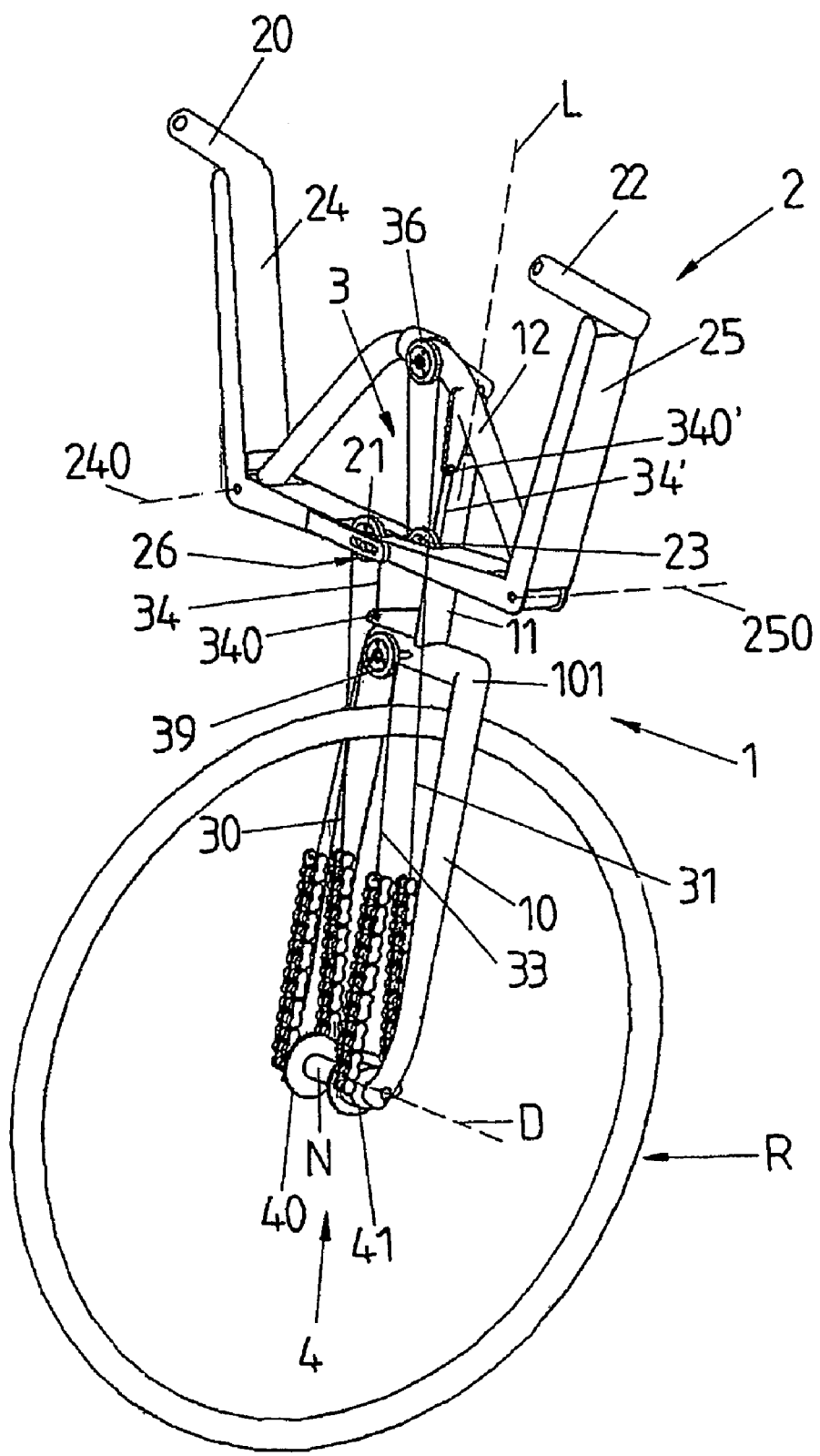
FIG. 8 shows a fifth variant of the hand-operated drive device.

FIG. 8 shows a fifth variant of the hand-operated drive device in combination with the drive means 4 from FIG. 1.

As in the embodiment according to FIG. 7, the crossmember 12 is bent downward. However, the guide means 2 is designed differently. The handles 20, 22 are arranged at the end of two lever arms 24, 25. These lever arms 24, 25, however, are shaped as angle elements. Each angle element 24, 25 extends with one leg outward transversely with respect to the steering plane of symmetry and then bends upward in an angular portion. The bend angle is in this case almost 90°.

The handles 20, 22 are arranged symmetrically with respect to the steering plane of symmetry at those ends of the levers 24, 25 which face away from the steering plane of symmetry. The other end portions are coupled to one another in the region of the steering plane of symmetry via a bearing means 26, in such a way that the levers can be moved symmetrically with respect to the steering plane of symmetry about the pivot axes 240, 250 arranged in the angular region of the levers and coupled to the crossmember 12. The bearing means 26 comprises a rectilinearly designed slot arranged in the first lever 24 and a bearing bolt arranged on the second lever arm 25 and engaging into the slot. During the symmetrical movement of the handles 20, 22, the bearing bolt moves back and forth between the two end portions of the slot.

The first and the second coupling means 21, 23 for coupling a force transmission train 3 are provided adjacently to the bearing means 26. The two coupling means 21, 23 are designed in the form of deflecting pulleys. The first end of the force transmission train 3 is fastened below the first coupling means 21 to the steering gear 1, here to the steering shaft 11, at a fixing point 340. The force transmission train 3 extends from there in the first force transmission portion 30 around the first coupling means 21 to the drive means 4.

The second end of the force transmission train 3 is fastened above the second coupling means 23 to the crossmember 12 at a fixing point 340'. It loops from there around the second coupling means and runs upward again as far as a force transmission deflection element 36 arranged in the region of the bending point of the crossmember 12 and taking the form of a deflecting pulley. This deflecting pulley deflects the force transmission train 3 essentially through 180° downward in the direction of the drive means 4. In this case, it is essential that the force transmission deflection element 36 is arranged above the fixing point 340' of the second end of the force transmission train 3.

This arrangement ensures that, during the pivoting movement of the handles 20, 22, the coupling means 21, 23 move up and down symmetrically with respect to the axis of symmetry and shorten or lengthen the first and the second force transmission portion 30, 31 in opposition, so that the force can consequently be transmitted to the drive means.

Figure 9:
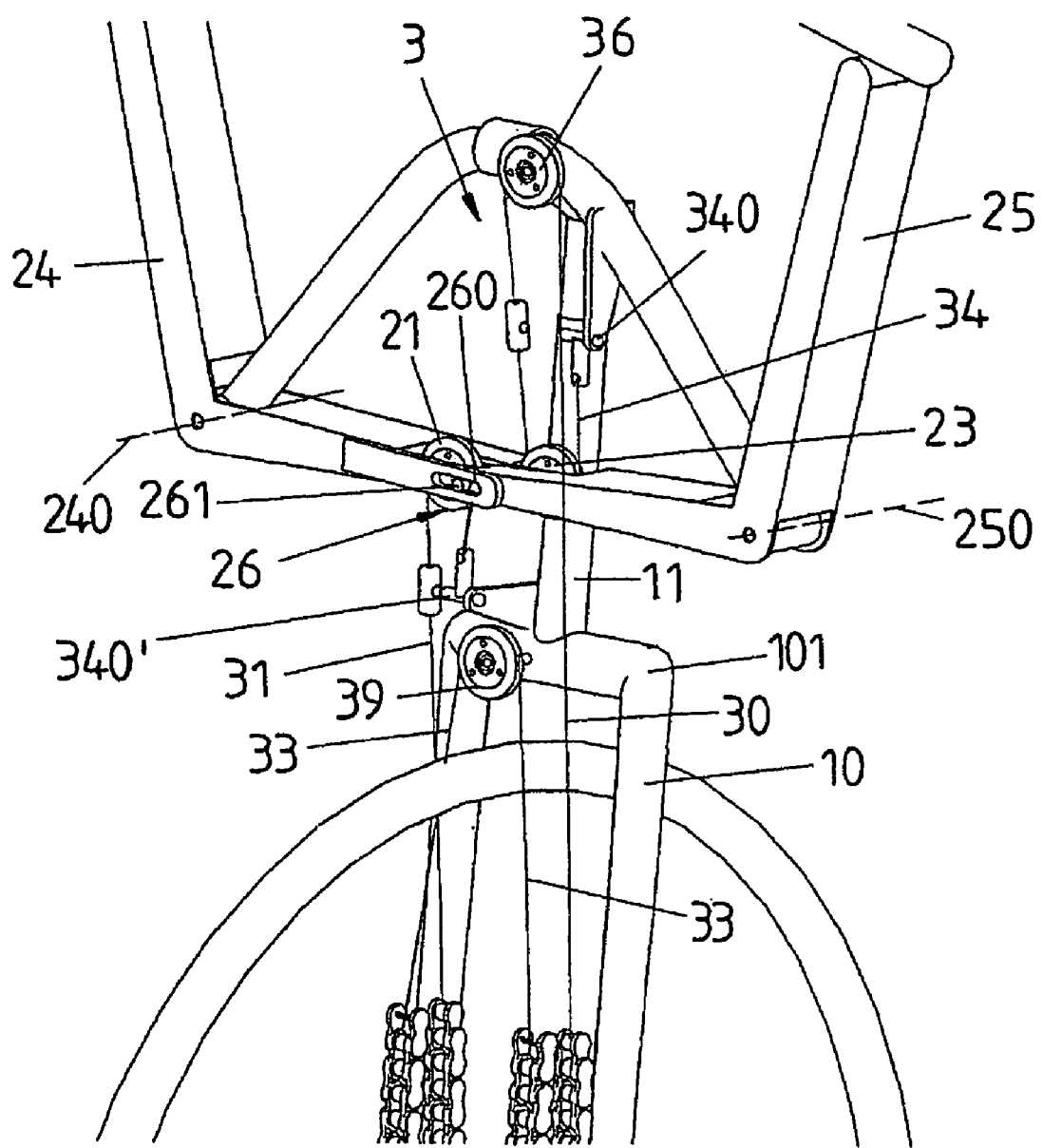
FIG. 9 shows a variant of the hand-operated drive device from FIG. 8 in detail.

The two coupling means 21, 23 acting as deflecting pulleys in this case function as loose pulleys which cause force transmission in the ratio 2:1. A change in the force transmission to the ratio 1:1 can be achieved by the function of the loose pulleys being canceled. A modification, suitable for this purpose, of the hand-operated drive device from FIG. 8 is illustrated, somewhat enlarged, in FIG. 9.

The first and the second fixing point 340, 340' and those portions of the first and second force transmission portion 30, 31 which are adjacent to these points are for this purpose designed with coupling elements. These allow the release of the fixing to the steering gear 1, that is to say to the crossmember 12 or to the steering shaft 11, and mechanical cooperation such that the first and the second coupling means 21, 23 in the form of deflecting pulleys no longer act as loose pulleys.

Figure 10:
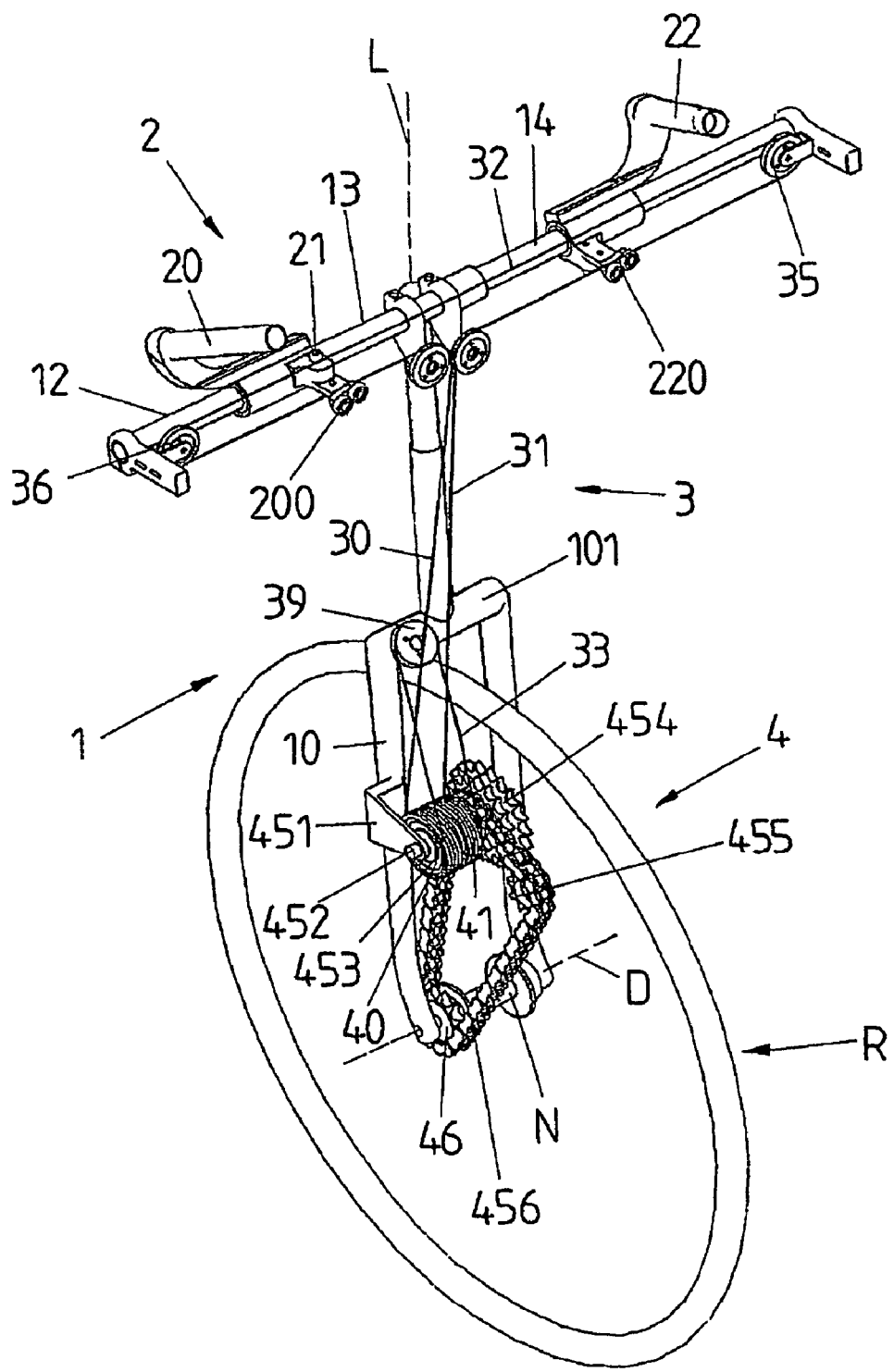
FIG. 10 shows the first variant of the device according to FIGS. 1 and 2 in combination with a third variant of a drive means.

FIG. 10 shows the first variant of the hand-operated drive device according to FIG. 3 in combination with a third variant of a drive means. Identical reference symbols again designate the same structural elements. Once again, the guide rail 15 is not illustrated for the sake of clarity.

The first and the second force transmission portion 30, 31 lead to a first and a second torque transmission means 40, 41. In contrast to the embodiments described above, the torque transmission means are both arranged on the same side of the guided wheel R. Moreover, they are not positioned on the axis of rotation D of the guided wheel R, but in the region between the change deflection element 39 and the hub N. For this purpose, the fork 10 has a holding means 451. An intermediate shaft 453 is mounted rotatably about an axis 452 on this holding means 451. The axis 452 is arranged essentially parallel to the axis of rotation D of the guided wheel. The two torque transmission means in the form of two rope drums 40, 41 are arranged rotatably on the intermediate shaft 453. The two rope drums 40, 41 have, opposite to the driving direction of rotation of the wheel R, a freewheel with respect to the intermediate shaft 453. A chain wheel assembly 454, such as is known from bicycle chain shifts, is arranged adjacently to the two rope drums 40, 41 on the intermediate shaft 453. During rotation in the driving direction of rotation, the rope drums 40, 41 in each case drive the chain wheel assembly 454 in driving rotation.

The force transmission train 3 is guided between the first rope drum 40 and the second rope drum 41 with a change deflection element 39, fastened to the fork head 101, in a change portion 33. As shown in FIGS. 1, 2 and 7-9, the guidance of the change portion 33 takes place such that the first rope drum 40 rotates in freewheel when the second rope drum 41 rotates in the wheel driving direction, and vice versa.

The rotation of the chain wheels of the chain wheel assembly 454 can be transmitted by means of a drive chain 456 which is connected operatively to the chain wheel assembly 454 and to a drive chain wheel 46 arranged on the hub N. For changing the drive chain 456 between the chain wheels of different size of the chain wheel assembly 454, an overthrow, not illustrated in FIG. 10, is provided. Such an overthrow corresponds essentially to the overthrows, known from bicycle technology, for the front chain leaves. So that the drive chain 456 has sufficient tension for all the chain wheels of the chain wheel assembly 454, a tension chain wheel 455 is provided, which deflects the drive chain 456 between the chain wheel assembly 454 and the drive chain wheel 46 triangularly. For this purpose, the tension chain wheel 455 may be designed as a spring arm articulated with a spring means on the holding means 451.

The above-described variant of the drive means affords the advantage, in particular, that it can be combined with a bicycle which uses disk brake systems, and that a chain wheel assembly for a chain shift of the drive means 4 is not operated with an alternating rotational movement. This variant is also suitable for a bicycle fork 10 designed resiliently between the holding means 451 and hub N, because the tension chain wheel 455 compensates the compression travel. If the spring device of the fork is arranged above the holding means 451, the change portion 33 and/or the change deflection element 39 may be designed elastically in such a way that the compression movement is compensated.

All the above-described variants of the drive means can be combined with hubs N of the guided wheel R which in each case have a commercially available hub shift.

It goes without saying that all the above-described variants of the hand-operated drive device can be combined with the different variants of the drive means. For this purpose, in each individual case, it is necessary to orient the force deflection elements 37, 38 differently or to provide additional deflection elements in the first and/or the second force transmission portion 30, 31.

LIST OF REFERENCE SYMBOLS

1 Steering gear
10 Fork
101 Fork head
11 Steering shaft
12 Crossmember
13 Sliding portion 14 Sliding portion
15 Guide rail
2 Guide means
20 First handle
200 Stabilizing element
21 First coupling means
22 Second handle
220 Stabilizing element
23 Second coupling means
24 First lever arm
240 Pivot axis of first lever arm
25 Second lever arm
250 Pivot axis of second lever arm
26 Bearing means
260 Slot
261 Guide bolt
3 Force transmission train
3' Extension train
3" Second force transmission train
30 First force transmission portion
300 Coupling means
31 Second force transmission portion
310 Coupling means
32 Coupling portion
33 Change portion
34 First end of the force transmission train
340 Fixing point of the first end
34' Second end of the force transmission train
340' Fixing point of the second end
35 Coupling deflection element
36 Force transmission deflection element
37 First force deflection element
38 Second force deflection element
39 Change deflection element
4 Drive means
40 First torque transmission means
41 Second torque transmission means
42 First chain wheel
42' First gearwheel
43 Second chain wheel
43' Second gearwheel
44 Chain
45 First end of the chain
450 Coupling means
45' Second end of the chain
450' Coupling means
46 Drive chain wheel
47 Deflecting pulley
48 Deflecting pulley
49 Chain wheel
49' Chain wheel
451 Holding means
452 Axis
453 Intermediate shaft
454 Chain wheel assembly
455 Tension chain wheel
456 Drive chain
R Guided wheel
D Axis of rotation of the guided wheel
N Hub of the guided wheel
L Steering axis

The invention claimed is:

1. A device for hand-driven operation of a guided wheel (R) which is arranged on a steering gear (1) and which is pivotable about a steering axis (L) oriented perpendicularly with respect to the axis of rotation (D) of the guided wheel, with
   a first handle (20),
   a first coupling means (21) arranged on the first handle (20),
   a second handle (22),
   a second coupling means (23) arranged on the second handle (22),
   a guide means (2), pivotable about the steering axis (L) and cooperating mechanically with the steering gear (1), for the movable mounting of the handles (20; 22), and
   a force transmission train (3), coupled to the first and to the second coupling means via coupling points so as to transmit tractive force, for transmitting a movement of the handles (20, 22) to a drive means (4) which cooperates with the hub (N) of the guided wheel (R) and which converts the movement of the handles (20, 22) into a rotational movement of the guided wheel (R),
   the guide means (2) having a mechanical positive guidance of the handles (20, 22) in such a way that the handles (20, 22) can only be moved mirror-symmetrically with respect to a steering plane of symmetry in which the steering axis (L) lies and which is oriented perpendicularly to the axis of rotation (D) of the guided wheel (R),
   wherein the force transmission train (3) extends from the first coupling means (21) via deflection elements (35, 36, 37, 38), which cause a change in the direction of extent of the force transmission train (3), in a first force transmission portion (30), to the drive means (4) and from the drive means (4), via deflection elements (35, 36, 37, 38) which cause a change in the direction of extent of the force transmission train (3), in a second force transmission portion (31), to the second coupling means (23), in such a way that the coupling means (21, 23) move the coupling points of the force transmission train (3) on essentially rectilinear drive paths approaching and absenting of the steering plane of symmetry.

2. The device as claimed in claim 1, wherein a length change, induced by the movement of the handles (20, 21), of the first force transmission portion (30) causes a length change of opposite sign and of identical amount of the second force transmission portion (31).

3. The device as claimed in claim 1, wherein the handles (20, 22) are arranged in such a way that they can be moved back and forth in each case between two guide path end portions on rotational and/or translational handle guide paths.

4. The device as claimed in claim 1, wherein the device comprises a drive means (4) which has on the hub (N) a first torque transmission means (40) provided with a freewheel and a second torque transmission means (41) provided with a freewheel, which act on the guided wheel (R), and in that the force transmission train (3) or an extension train (3') fastened to the force transmission train (3) so as to transmit tractive force is guided from the first torque transmission means (40) to the second torque transmission means (41) by a change deflection element (39) arranged on the steering gear (1) and in this case forms a change portion (33) between the torque transmission means (40, 41).

5. A device for hand-driven operation of a guided wheel (R) which is arranged on a steering gear (1) and which is pivotable about a steering axis (L) oriented perpendicularly with respect to the axis of rotation (D) of the guided wheel, with
   a first handle (20),
   a first coupling means (21) arranged on the first handle (20),
   a second handle (22),
   a second coupling means (23) arranged on the second handle (22),
   a guide means (2), pivotable about the steering axis (L) and cooperating mechanically with the steering gear (1), for the movable mounting of the handles (20; 22), and
   a force transmission train (3), coupled to the first and to the second coupling means via coupling points so as to transmit tractive force, for transmitting a movement of the handles (20, 22) to a drive means (4) which cooperates with the hub (N) of the guided wheel (R) and which converts the movement of the handles (20, 22) into a rotational movement of the guided wheel (R), the guide means (2) having a mechanical positive guidance of the handles (20, 22) in such a way that the handles (20, 22) can only be moved mirror-symmetrically with respect to a steering plane of symmetry in which the steering axis (L) lies and which is oriented perpendicularly to the axis of rotation (D) of the guided wheel (R), wherein the force transmission train (3) extends from the first coupling means (21) via deflection elements (35, 36, 37, 38), which cause a change in the direction of extent of the force transmission train (3), in a first force transmission portion (30), to the drive means (4) and from the drive means (4), via deflection elements (35, 36, 37, 38) which cause a change in the direction of extent of the force transmission train (3), in a second force transmission portion (31), to the second coupling means (23), in such a way that the coupling means (21, 23) move the coupling points of the force transmission train (3) on essentially rectilinear drive paths approaching and absenting of the steering plane of symmetry; and wherein the guide means (2) is designed in such a way that the force transmission train (3) connects the first coupling means (21) in a coupling portion (32) to the second coupling means (23) via a coupling deflection element (35) for the positive guidance of the handles (20, 22) so as to transmit tractive force, the coupling deflection element (35) deflecting the force transmission train (3) through essentially 180, and the two force transmission portions (30, 31) being coupled to one another via the drive means (4) so as to transmit tractive force.

6. The device as claimed in claim 5, wherein the guide means (2) has a force transmission deflection element (36) which is arranged in the second force transmission portion (31) and which is arranged mirror-symmetrically with respect to the steering plane of symmetry in relation to the coupling deflection element (35).

7. The device as claimed in claim 6, wherein the steering gear (1) has a fork (10) for receiving the guided wheel (R) and a steering shaft (11) arranged on the fork (10) and extended along the steering axis (L).

8. A device for hand-driven operation of a guided wheel (R) which is arranged on a steering gear (1) and which is pivotable about a steering axis (L) oriented perpendicularly with respect to the axis of rotation (D) of the guided wheel, with a first handle (20), a first coupling means (21) arranged on the first handle (20), a second handle (22), a second coupling means (23) arranged on the second handle (22), a guide means (2), pivotable about the steering axis (L) and cooperating mechanically with the steering gear (1), for the movable mounting of the handles (20; 22), and a force transmission train (3), coupled to the first and to the second coupling means via coupling points so as to transmit tractive force, for transmitting a movement of the handles (20, 22) to a drive means (4) which cooperates with the hub (N) of the guided wheel (R) and which converts the movement of the handles (20, 22) into a rotational movement of the guided wheel (R), the guide means (2) having a mechanical positive guidance of the handles (20, 22) in such a way that the handles (20, 22) can only be moved mirror-symmetrically with respect to a steering plane of symmetry in which the steering axis (L) lies and which is oriented perpendicularly to the axis of rotation (D) of the guided wheel (R), wherein the force transmission train (3) extends from the first coupling means (21) via deflection elements (35, 36, 37, 38), which cause a change in the direction of extent of the force transmission train (3), in a first force transmission portion (30), to the drive means (4) and from the drive means (4), via deflection elements (35, 36, 37, 38) which cause a change in the direction of extent of the force transmission train (3), in a second force transmission portion (31), to the second coupling means (23), in such a way that the coupling means (21, 23) move the coupling points of the force transmission train (3) on essentially rectilinear drive paths approaching and absenting of the steering plane of symmetry;

wherein the guide means (2) is designed in such a way that the force transmission train (3) connects the first coupling means (21) in a coupling portion (32) to the second coupling means (23) via a coupling deflection element (35) for the positive guidance of the handles (20, 22) so as to transmit tractive force, the coupling deflection element (35) deflecting the force transmission train (3) through essentially 180, and the two force transmission portions (30, 31) being coupled to one another via the drive means (4) 50 as to transmit tractive force;

wherein the guide means (2) has a force transmission deflection element (36) which is arranged in the second force transmission portion (31) and which is arranged mirror-symmetrically with respect to the steering plane of symmetry in relation to the coupling deflection element (35);

wherein the steering gear (1) has a fork (10) for receiving the guided wheel (R) and a steering shaft (11) arranged on the fork (10) and extended along the steering axis (L);

wherein a crossmember is fastened to the steering shaft (11), the crossmember having end portions on which the coupling deflection element (35) and the force transmission deflection element (36) are arranged; and wherein a first force deflection element (37) and a second force deflection element (38) for deflecting the first and the second force transmission portion (30, 31) in the direction of the drive means (4) are provided on the steering shaft (11) and/or on the crossmember (12).

9. The device as claimed in claim 8, wherein the crossmember (12) has two sliding portions (13, 14) arranged symmetrically with respect to the steering plane of symmetry, the handles (20, 22) with the assigned coupling means (21, 23) being movable back and forth along these sliding portions (13, 14).

10. The device as claimed in claim 9, further comprising a guide rail (15) fastened to the crossmember (12) parallel to the sliding portions (13, 14), the guide rail (15) cooperating with stabilizing elements (200, 220), arranged on the coupling means (21, 23), for stabilizing the movement of the handles (20, 22).

* * * * *

UNITED STATES PATENT AND TRADEMARK OFFICE
CERTIFICATE OF CORRECTION

PATENT NO. : 7,726,676 B2  
APPLICATION NO. : 11/578219  
DATED : June 1, 2010  
INVENTOR(S) : Monno Page 1 of 1

It is certified that error appears in the above-identified patent and that said Letters Patent is hereby corrected as shown below:

In Column 21, line 32, after the word "essentially", please change "180" to correctly read: --180°--.
In Column 22, line 29, after the word "essentially", please change "180" to correctly read: --180°--.
In Column 22, line 31, after the numeral "(4)", please change "50" to correctly read: --so--.

Signed and Sealed this
Nineteenth Day of July, 2011

David J. Kappos
*Director of the United States Patent and Trademark Office*